Feb. 27, 1934.         G. RENFRO         1,949,130
MEASURING BOTTLE
Filed Feb. 16, 1933
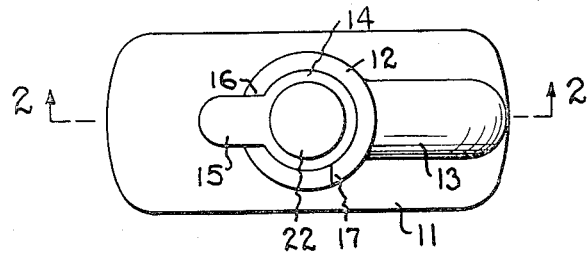
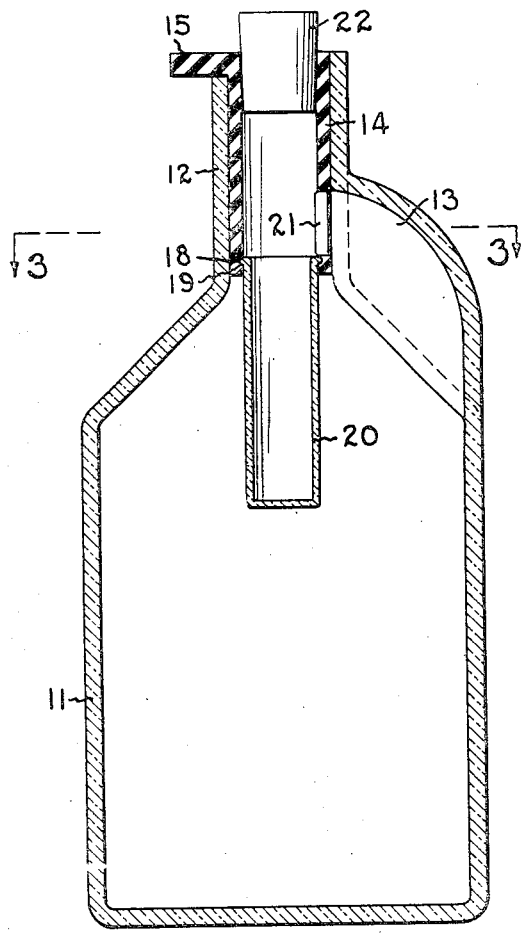
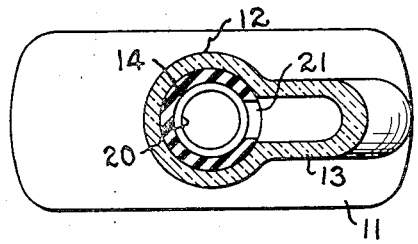
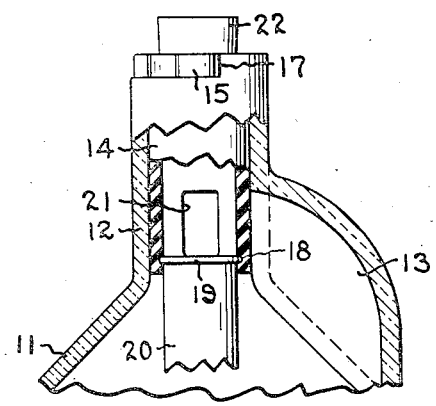
INVENTOR.
GRANT RENFRO.
BY
H. C. Karel.
ATTORNEY.

Patented Feb. 27, 1934

1,949,130

UNITED STATES PATENT OFFICE 1,949,130

MEASURING BOTTLE

Grant Renfro, Covington, Ky.

Application February 16, 1933. Serial No. 657,080

2 Claims. (Cl. 215—57)

My invention relates to a new and useful improvement in a measuring bottle, and more particularly to a medicine bottle wherein it is desired to accurately measure a given amount of medicine within the bottle prior to pouring the same therefrom. Medicine is usually measured with a teaspoon or tablespoon and often spoons are used which either hold more or less than the standard amount. In my invention the measuring container within the bottle is made to hold either one-half teaspoonful, a teaspoonful or a tablespoonful, thereby eliminating any guessing on the part of the person using the medicine. Furthermore the medicine can be taken direct from the bottle without the aid of a spoon, with the knowledge that the correct amount of medicine is being taken.

The object of my invention is to provide a bottle with means to measure a given amount of liquid in the bottle prior to pouring the liquid from the bottle.

A further object is to provide the bottle with a rotating member for opening a port to permit the liquid to fill the measuring tube and to close the port for retaining the liquid in the tube free from the liquid in the bottle, whereby the liquid can be poured from the tube and the balance in the bottle will be held in check.

A further object is to provide the bottle with means for limiting the movement of the rotating member.

My invention will be further readily understood from the following description and claims, and from the drawing, in which latter;

Fig. 1 is a plan view of my improved bottle.

Fig. 2 is a vertical cross-section of the same, taken on the line 2—2 of Fig. 1.

Fig. 3 is a cross-section of the same, taken in the plane of the line 3—3 of Fig. 2, and;

Fig. 4 is a detailed view, partly in section and partly broken away, with the rotating member turned to close the opening between the bottle and the tube.

My invention relates to a bottle provided with means within the bottle for accurately measuring a given amount of liquid, it is desired to remove from the bottle. The device comprises a bottle 11 provided with a neck 12 and a bulged-out portion 13 on one side of the bottle adjacent to the neck. A tubular insert 14 preferably of rubber has a lug 15 extending from the upper end of the insert and arranged to be moved through an arc limited by shoulders 16 and 17 on the upper edge of the neck of the bottle. Adjacent to the lower edge of the insert is a rabbet 18 in which a flange 19 of a measuring bottle 20 is received. Above the rabbet and directly opposite the lug 15 is an opening 21 in the insert, forming a passage between the insert and the bulged-out portion 13 of the bottle. A cork 22 is received in the tubular member for closing the bottle.

The measuring bottle or container 20 can be removed and larger or smaller bottles placed or connected to the tubular insert for measuring various quantities of liquid from the bottle. My device is especially useful in connection with medicine bottles, and the measuring container may be made in sizes to hold one-half teaspoonful, one teaspoonful or a tablespoonful whereby the correct container can be assembled in the bottle for measuring the prescribed amount of liquid to be taken in one dose.

In using the device, with the insert in the position shown in Figs. 1 and 2, the bottle is inverted and then slowly returned to normal position to permit the liquid to fill the measuring container. The lug 15 is then turned to the position shown in Fig. 4, for presenting the opening 21 against the neck of the bottle and closing the passage between the bulge and the insert. The cork is then removed and the contents of the measuring container poured therefrom.

It is obvious that various changes may be made in the construction of my device within the scope of the appended claims.

Having thus fully described my invention, what I claim as new and desire to secure by Letters Patents, is:

1. A measuring closure for a bottle having a port in the side wall of the neck communicating with the body of the bottle, comprising a rotatable, flexible, tubular element having an opening in the side wall thereof adapted to be turned into and out of registry with the port in the bottle and a measuring receptacle mounted in the end of the tubular element extending toward the body of the bottle and a closure for the other end of the tubular element.

2. A measuring closure for a bottle having a port in the side wall of the neck communicating with the body of the bottle, comprising a rotatable, flexible, tubular element having an opening in the side wall thereof adapted to be turned into and out of registry with the port in the bottle and a measuring receptacle removably and frictionally mounted in the end of the tubular element extending toward the body of the bottle and a closure for the other end of the tubular element.

GRANT RENFRO.